Oct. 24, 1967 L. M. SPRENGERS ETAL 3,349,388

ANALOG TO DIGITAL CONVERTER ARRANGEMENT

Filed June 15, 1964 2 Sheets-Sheet 1

INVENTORS.
HENRI CASTELIJNS
LEO M. SPRENGERS
ATTY.

ANALOG TO DIGITAL CONVERTER ARRANGEMENT

Filed June 15, 1964

2 Sheets-Sheet 2

United States Patent Office 3,349,388
Patented Oct. 24, 1967

3,349,388
ANALOG TO DIGITAL CONVERTER ARRANGEMENT

Leo M. Sprengers, Lier, and Henry Castelijns, Wilrijk, near Antwerp, Belgium, assignors to Automatic Electric Laboratories, Inc., Northlake, Ill., a corporation of Delaware Filed June 15, 1964, Ser. No. 374,941
Claims priority, application Belgium, July 23, 1963, 635,281
6 Claims. (Cl. 340—347)

ABSTRACT OF THE DISCLOSURE

A plurality of sources of electrical analog signals are scanned sequentially by an electronic or electromagnetic scanning switch and the analog signals are converted into digital signals by means of a signal conversion device which includes a mirror galvanometer, the coil of which is sequentially connected to each of the analog signal sources. In response to detecting an analog signal, the coil is rotated angularly in proportion to the magnitude of the signal detected and this angular movement is referenced by means of a light and a photocell and via the mirror to a train of digital pulses, also generated by the conversion device, such that the number of pulses in the train represents a digital measure of the magnitude of the analog signal detected. The scanning switch is operatively connected to the conversion apparatus so that the operation of the scanning switch is synchronized with the operation of the signal conversion device.

This invention relates in general to a device for converting electrical analog signals into digital signals. The invention also relates to a system incorporating such a device.

In our copending application; Analog To Digital Converter Arrangement, Ser. No. 308,581, filed Sept. 12, 1963 there is described a device which makes it possible (and more particularly in measuring instruments) to convert angular displacements of a rotatable element into electric signals, preferably of digital form, thus clearly and unquestionably characterizing the angular position of aforesaid rotatable element. This device is mainly characterized by the fact that it comprises an optical scanning device made up of at least one plane mirror, fixedly attached to the element of which the angular displacement has to be measured, a source of radiation which directs a very precisely limited beam on aforesaid mirror, as well as at least one radiation sensitive detector with a precisely limited angle of opening, aforesaid elements being mounted moveably with respect to each other in such a manner, that only one single configuration of aforesaid elements corresponds to each possible value of the angle of displacement to be measured, whereby the beam emitted by the source of radiation is intercepted, after reflection by the mirror, at maximum value by aforesaid radiation detector, the device also comprising a mechanical driving system which causes aforesaid elements to pass successively through all these configurations.

In the embodiment described as example of this device, a source of light has been used, which turns with a uniform velocity around the axis of rotation of aforesaid rotatable elements along a circular path, projecting at all times a highly concentrated beam of light upon the mirror, the latter being disposed in such a way that aforesaid axis of rotation is located within the reflecting surface. A photocell is used as a detector and is mounted in such a way, that at each rotation of the source of light around the axis of rotation of the mirror, the beam of light reflected by the latter is for a short instant intercepted by aforesaid detector at a moment which is entirely dependent of the instantaneous position of aforesaid mirror.

The source of light is fixedly mounted on a drum or disc-shaped rotatable device, of which the axis of rotation coincides with that of the mirror, driven at constant speed by an electric motor, and along or parallel to the circumference of which a number of magnetic dipoles have been fitted covering an angle of at least twice the maximum angular displacement of aforesaid rotatable element and which induce electric impulses in the reading device set up nearby. These impulses are transmitted to an electronic circuit which is on the other hand connected to the photocell in such a manner that the transmission of the impulses to the output of aforesaid electronic circuit is blocked as soon as the photocell receives a signal. In this manner one obtains, during each revolution of the disc or drum which carries the source of light, a train of impulses at the output of the electronic circuit, the number of impulses in each train being proportional to the angular deviation of aforesaid rotatable element.

The present invention relates to one of the main applications of this device, and namely where it is employed for converting values of current or of potential into digital form. For this purpose the current or potential is measured by means preferably of a pointer measuring instrument in which rotary parts are present, and wherein the angular displacement gives the measure of the measured current or potential. This angular displacement is then converted into a series of impulses by means of an optical scanning device in the manner described in the main patent.

In order to be able to exploit to a maximum the advantages of this device, the idea was developed of sequentially using the same device for measuring and for converting into digital form the current and/or potential values. For this purpose, the measuring input of the electrical measuring instrument is connected, by means of a commutator or scanning switch, sequentially to the various measuring points.

In modern measuring and control apparatus, especially in the remote measuring technique, it is most important to be able automatically to scan and transmit a great number of different measured values in quick succession. If, when using the system, as described in copending application No. 308,581, one desires to increase further and further the speed with which the various measurements succeed each other, one runs into difficulties due to the mechanical ineria of the moving parts. Each time the scanning switch connects to a new measuring point, a certain time is required before the pointer, or respectively the mobile element of the measuring instrument, can take up the new angular position. If the rotatable system is unsufficiently damped, this element will only come to rest after a relatively long time of damping oscillation. Should on the other hand the damping effect be too strong, then the movable element will only creep slowly towards its final position.

On the other hand, the mass inertia of the optical scanning system, and particularly of the drum or disc which carries the source of light, is so considerable, that it is impracticable to bring this mass to a stand-still between each successive measurement. It is thus desirable that this entire assembly should go on turning at constant speed during the entire series of measurements. This will however often lead to the fact that the angular position of the rotatable element will be scanned by the beam of light when, after switching over to a new measuring point, the rotatable element has not yet reached its new final position and is consequently still moving, so that a series of impulses is transmitted, which causes an incorrect measured value to be reproduced.

It is therefore an object of the present invention to supply a satisfactory solution for these problems. According to one aspect of the present invention, a mirror galvanometer is used as a measuring instrument in a set-up as described in the main patent. Such galvanometers are provided with a small mirror which is solidly fixed to the rotating system and is used in conventional applications for direct mirror readings. In the present case however, the mirror can straight away be used as part of the optical scanning system. These galvanometers are moreover in general of a very sensitive type and can, by means of a judicial choice of dimensions and materials, be constructed in such a manner as to possess a high cut-off frequency, which means that they have a small time constant, making it possible to reduce the transition time from one angular position to the next to a minimum. It is further desirable, that the moving system should have an extremely small moment of inertia and should be subjected to a relatively weak directing force. For these reasons and according to this invention, it is preferable to use a moving coil galvanometer, which can simultaneously satisfy all these conditions. It is well known that in such an instrument the rotatable system consists of a wire coil which is stretched in length and which is suspended by a long fine wire in a permanent magnetic field, aforesaid wire also serving the purpose of feed wire. The electric circuit is closed by a very thin spiral of silver wire, which also takes care of the tensioning of the suspension wire. The long and narrow coil of wire has a small moment of inertia, whereas the directing force brought about by the twist of the suspension wire is relatively very weak. In order to prevent a longlasting damping oscillation, the mobile system should be subjected to a sufficiently large damping moment. When taking into consideration that the electromagnetic damping effect created by induction in the coil of wire is highly dependent upon the resistance in the measuring circuit, it is preferable to provide for an independent means of damping, and preferably a liquid damping system, of which the damping moment is by approximation proportional to the speed of angular displacement of the mobile system.

By means of a judicious choice of the aforementioned parameters it is possible to construct a galvanometer of which the time of deviation is small with respect to the time required by the optical scanning system to complete half a revolution.

If such a galvanometer were combined with a scanning switch, by means of which the input terminals of the galvanometer are successively connected to a series of measuring locations, it is possible to scan and convert into a digital signal a new measured value during each rotation of the optical scanning system. It has however to be seen to, that the switching from one measuring location to the next is not carried out before the previous measured value has been scanned and converted.

As described in the above mentioned copending application the source of light travels during the scanning operation through a certain length of arc $\alpha$, smaller than 360°, which stretches from one point, corresponding to the zero reading i.e. from which the beam of light exactly strikes the photo-cell, after reflection by the mirror, when the rotatable element which carries the mirror is in its zero position—to a point corresponding to the maximum reading i.e. when the beam of light strikes the photocell after reflection on the mirror, when aforesaid rotatable element shows its maximum deviation. In principle the switching through must be prevented as long as the source of light remains on aforesaid path. During the remaining part of the revolution, which stretches over the remaining angle of 360°—$\alpha$, the source of light will at any rate be behind the mirror, which ever be the angular position taken up by the latter within the measuring range.

According to a further aspect of this invention, the control of the scanning switch is timed in such a manner with respect to the optical scanning system, that the switching through from one measuring location to the next can only occur during that part of the revolution when the light source is behind the mirror.

The latter can be brought about in various ways. In one favourable embodiment, in which a scanning switch of the commutator type is used, whereby a brush or conducting segment is moved continuously along a series of equidistant contacts, it is sufficient to provide a mechanical coupling between the driving motor and the commutator shaft, a gear transmission for instance, in which the transmission ratio is such, that the commutator is displaced exactly by one contact space for each complete revolution of the optical scanning system.

The desired synchronous operation can however also be obtained by means of an electric coupling. For the scanning of the measuring locations, use could be made of a step by step switch, operated by an impulsion controlled by the optical scanning device, once for each revolution of the source of light and at the correct moment, for instance immediately after the latter has passed the end of arc $\alpha$. It is however also possible to start the switching through as soon as the previous measurement is terminated, i.e. at the moment the beam of light strikes the photocell. To this purpose ti will be sufficient to make a connection between the light detector and the source of impulses in such a manner that the latter is struck by the signal from the detector, thus forming an impulse, which is transmitted to the trip mechanism of the step by step switch.

In such application, where the scanning switch has to operate continuously at great speed, a mechanical step by step switch is not very useful due to its considerable wear. In such cases it is recommended to use an electronic step by step switch.

Other objects and aspects and a fuller understanding of the present invention may be had by referring to the following description and claims of preferrd embodiments of the invention taken in conjunction with the accompanying drawings in which:

Figure 1:
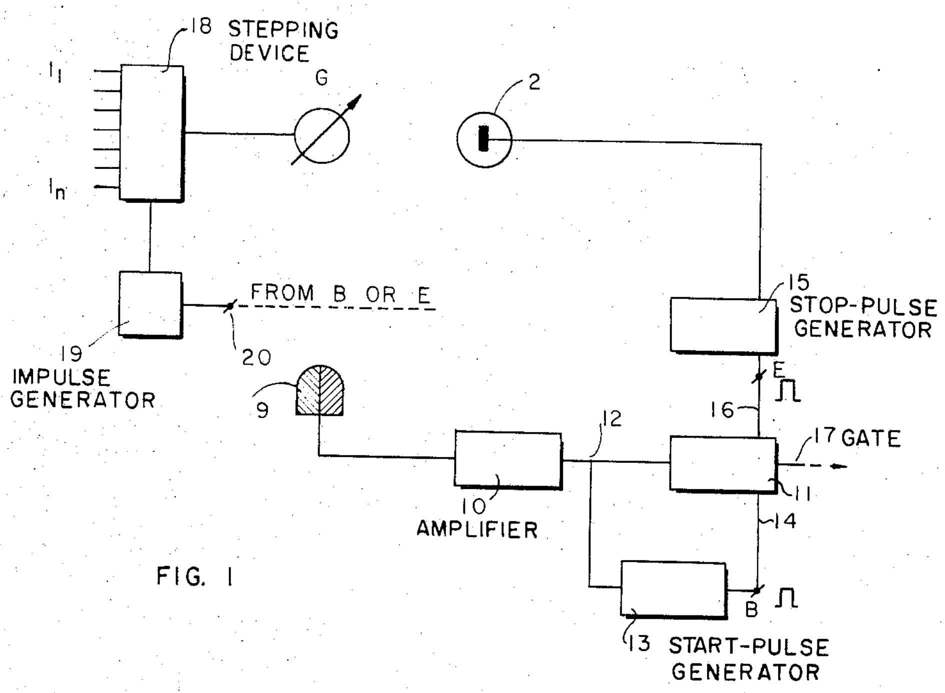
FIG. 1 is a diagram in block form of the scanning measuring system.
Figure 2:
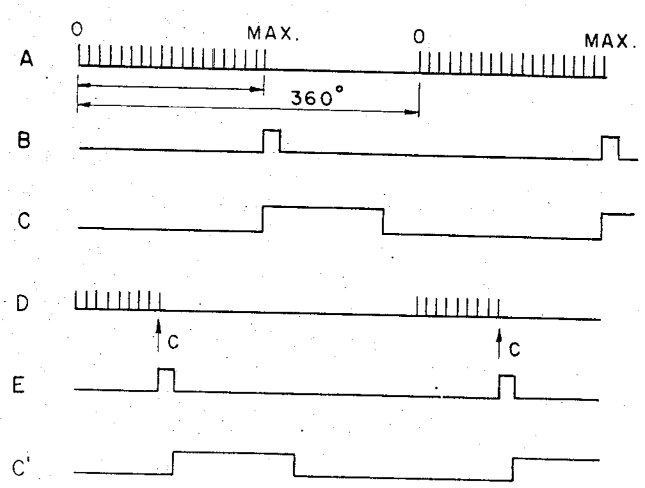
FIG. 2 is a diagram helpful in the explanation of the operation of the invention.

With reference to the drawings, a favourable form of embodiment according to the present invention will be described in greater detail. FIGURE 1 of the drawing shows a block diagram which is generally identical to that of FIGURE 3 in the above mentioned copending application, but to which certain elements have been added. FIGURE 2 is a schematic representation of the impulses generated in this circuit, in the same manner as FIGURE 4 of the copending application.

Figure 3:
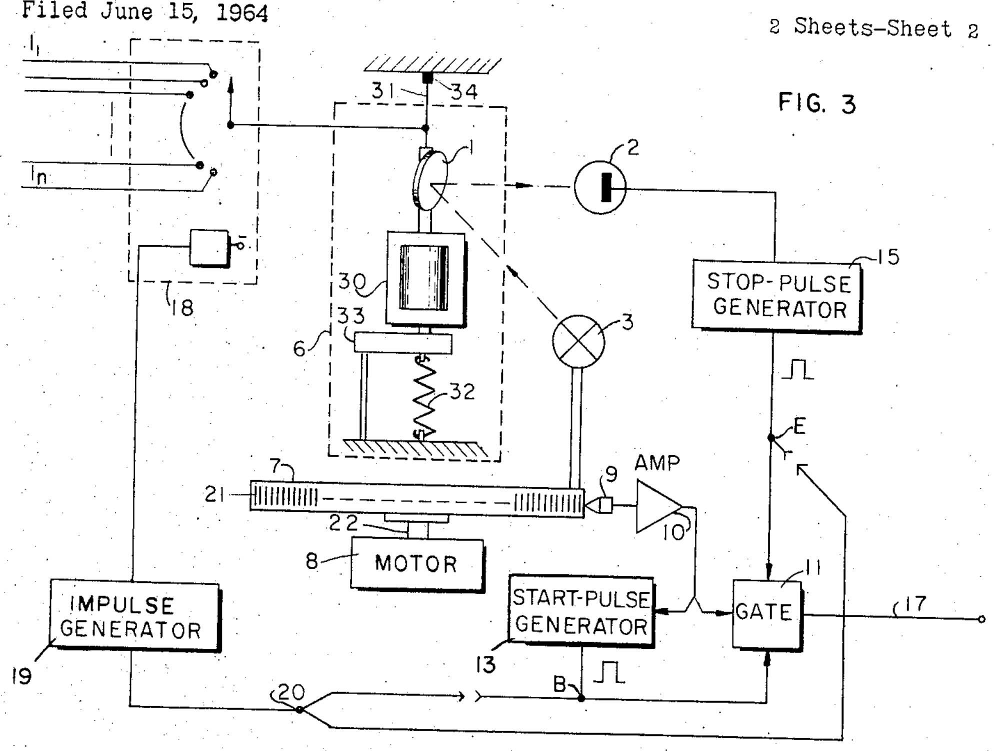
FIG. 3 shows one embodiment of the invention in somewhat greater detail; this figure illustrates the moving coil galvanometer with its optical scanning system, and also the scanning device and the electrical synchronization of the optical system to the scanning device.

FIGURE 3 shows the galvanometer G which includes a coil 30 suspended by a fine wire 31 and a thin spiral of silver wire 32. Also shown in FIG. 3 are the measuring locations or analog signal sources which are schematically represented by input connections $I_1$ to $I_n$, individually connected to galvanometer G via stepping device 18 and suspension wire 31. Wire 31 serves to suspend coil 30 in a permanent magnetic field and also serves to electrically connect the stepping device to the coil 30. Insulating block 34 prevents the grounding of wire 31. Wire 32 serves both to tension wire 31 and to complete the electrical circuit through coil 30 to ground. Liquid damping 33 tends to subject coil 30 to a sufficiently large and fairly constant damping moment. Stepping device 18 may be of the well known electromagnetic type or of the solid state electronic type.

A mirror 1 is mounted so as to be able to rotate with coil 30 when the galvanometer G responds to the measuring locations or analog signal sources represented by $I_1$ to $I_n$. A source of light 3, mounted on rotating drum 7, emits a beam of light which after reflection from mirror 1 is detected by photocell 2 thereby determining the amount of angular deflection of coil 30.

Figure 4:
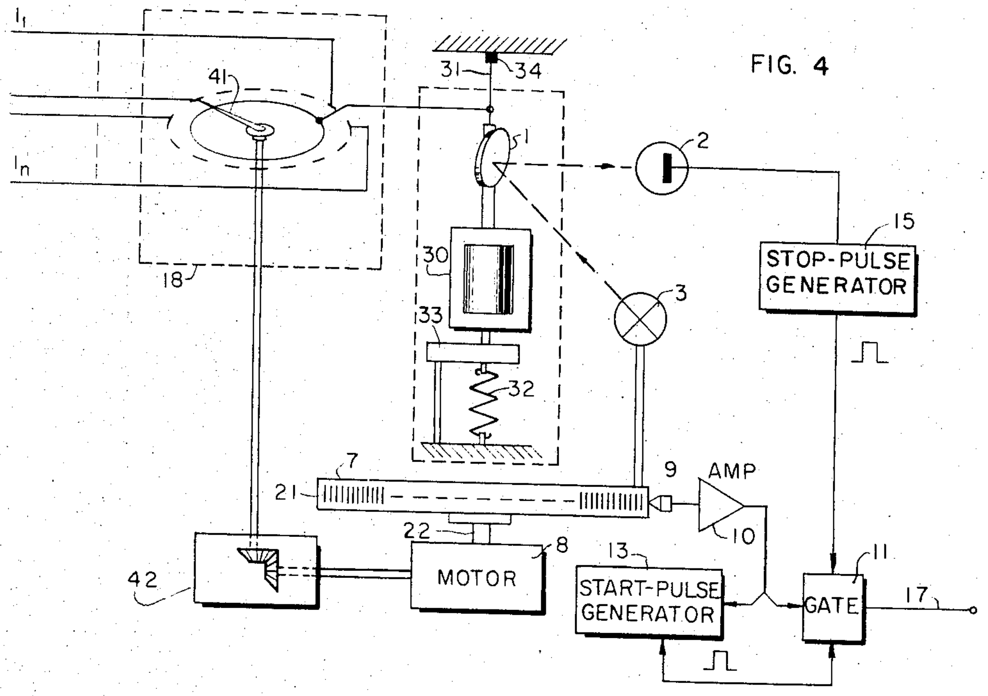
FIG. 4 shows an alternative form of synchronization and a commutator-type scanning switch using mechanical coupling between the optical system and the scanning switch.

In the diagrams of FIGURES 3 and 4, there is shown a magnitude detector or pickup head 9, and the magnetic dipoles or magnetizations 21 which are fitted to the magnetic recording drum or disc 7, to periodically induce a series of impulses as they are rotated by motor 8 and shaft 22 in front of detector 9. These impulses are shown in FIGURE 2 at A. Via an amplifier 10 these impulses reach a gate circuit 11, which in its open position transmits the impulses to output 17. The first impulse of this series is generated at the moment at which the source of light passes the zero point of the optical scale, while the series of impulses is stopped at the moment at which the source of light passes the point of maximum deviation. Aforesaid optical scale thus extends over an angle $\alpha$.

Besides being applied to the gate circuit, the series of impulses is also applied to the starting pulse generator 13, which at the end of each series of impulses delivers a starting impulse to a terminal B, as shown in FIGURES 1, 2, and 3 at B, and whereby gate 11 is opened. When the source of light passes the position in which the beam of light strikes photocell 2 after reflection, an electrical impulse is generated in the latter and is deliverd after amplification and regeneration in stop pulse generator 15, to terminal E which is connected to the gate circuit in the form which is represented at E of FIGURE 2. This again closes gate 11, so that the transmission of impulses to output 17 is stopped, as shown in FIGURE 2 D at C. At the lefthand side of FIGURE 1, the elements which are important for the explanation of the present invention are schematically represented. In this instance, G represents a sensitive galvanometer, preferably a moving coil galvanometer, which is connected by means of scanning switch 18 successively to a number of measuring locations or analog signal sources which are schematically represented by input connctions $I_1$, $I_2$ . . . $I_n$ of this switch. It will be understood that the other end of each of these sources is connected to ground in the usual manner. In the form of embodiment chosen for the present example, this scanning switch can either be of the electromagnetic or of the electronic type, which can be tripped by the impulses generated by impulse genrator 19.

This impulse generator of the type which is well known in the art gives off an impulse each time a triggering impulse is applied to terminal 20.

In order to assure the proper timing of the stepping device or step by step switch 18, it will be sufficient to connect triggering input 20 either to terminal B of the starter pulse generator 13 or to terminal E of the stop pulse generator 15. In the first case the switching-through impulse or control signal starts to be generated at the moment at which the source of light passes the end of the optical scale (see FIGURE 2 at C), so that certainty exists that aforesaid source of light is at that moment located behind the mirror; in the second case the switching-through impulse or control signal is already generated at the moment at which the beam of light sent out by the source of light strikes photocell 2 after reflection on the mirror (see FIGURE 2 at C'). In both cases the switching-through takes place during the passage through the "dead angle," during which the optical scanning device is inoperative, and no impulses are delivered to output 17. The total of this dead angle is thus available for the switching-through and the consequent adjustment of the galvanometer. In this manner it becomes possible in practice to convert fifty measured values per second into digital signals. In such a case it is advisable to use an electronic step by step switch, by means of which the switching-through can be effected in a few microseconds, thus leaving a maximum time available for the adjustment of the galvanometer.

FIG. 4 shows a mechanical coupling type of synchronization between the optical scanning system and the scanning switch, the latter being of the commutator type. This scanning switch 18" has individual contacts connected to the terminals under test. The wiper 41 is connected to suspension wire 31 of the galvanometer, and is rotated continuously from one contact to the other, under control of a gear transmission 42. The gear transmission is coupled to motor 8 and has a sufficient gear ratio so as to allow the wiper 41 to move from one contact to another for each complete revolution of the optical scanning system.

In order to be able to increase the precision as much as possible, the time constant of the galvanometer should be as small as possible. The digitalization of the measured value does however introduce a certain lack of precision, which becomes smaller as the definition, in this case the number of dipoles distributed along the optical scale, is made greater. It is therefore obvious that one has great advantage in choosing this number as large as possible within the band width tolerated by the transmission system. When however the impulses generated in detector 9 and transmitted to the gate circuit 11 follow each other at great speed, it will become necessary to take into consideration the reaction speed of the stop mechanism; in order to reduce digitalization errors to a minimum, it is essential that the time which elapses between the instant when the beam of light strikes photocell 2, and the instant when the gate circuit 11 is closed, should at any rate be smaller than the time interval between two successive impulses.

It is quite obvious, that the form of embodiment discussed above is only one of the many possible examples, considering that the desired timing can also be obtained in many other manners.

This invention is by no means limited to the discussed set-up, but extends to all other possible installations, such as remote measurement installations, in which analogical entities are converted into coded or noncoded digital signals by similar devices.

What is claimed is:

1. A system for sequentially converting a plurality of electrical analog signals appearing at a plurality of sources into digital electric signals, said system comprising:

a mirror galvanometer movement having a winding for receiving said analog signals, said galvanometer having a central axis;

means continuously rotating about said axis at a substantially constant angular speed of rotation;

means stationary with respect to said axis and cooperating with said continuously rotating means to provide a series of electrical pulses;

first control apparatus for receiving said series of electrical pulses and including means for providing a first control signal in a predetermined angular position of said continuously rotating means;

second control apparatus including a radiation source and a radiation detector, one of the last-mentioned two means being stationary and the other being mounted on said continuously rotating means, said radiation detector producing a second control signal in response to impingement on said detector of radiations from said source as reflected by said mirror when said galvanometer movement and said continuously rotating means have predetermined angular positions with respect to each other;

and scanning means electrically interposed between said plurality of signal sources and said galvanometer winding for sequentially connecting each of said analog signal sources to said winding in timed relationship with the rotation of said continuously rotating means.

2. A system according to claim 1, wherein said continuously rotating means includes a disc mounted on a shaft and having regularly spaced magnetic dipoles disposed along a portion of its circumference and wherein said stationary means includes a pickup head disposed adjacent to and in opposition with a portion of the circumference of said disc.

3. A system according to claim 1, wherein said scanning means comprises an electrically operated stepping device.

4. A system according to claim 3, and further including synchronizing means operatively connected to said stepping device and electrically connected to and controlled by said first control apparatus so as to cause said stepping device to advance once for each revolution of said continuously rotating means.

5. A system according to claim 3, and further including synchronizing means operatively connected to said stepping device and electrically connected to and controlled by said second control apparatus so as to cause said stepping device to advance each time said galvanometer movement and said continuously rotating means have said predetermined angular positions with respect to each other.

6. A system according to claim 1, and further including mechanical means coupling said scanning means and said continuously rotating means to synchronize the operation of said scanning means with the operation of said continuously rotating means.

No references cited.

MAYNARD R. WILBUR, *Primary Examiner.*

A. L. NEWMAN, W. KOPACZ, *Assistant Examiners.*